Feb. 18, 1958 G. G. FRATER ET AL 2,823,821
SEPARABLE PLASTIC PANEL BOX
Filed July 6, 1955 2 Sheets-Sheet 1

Inventors:
George G. Frater
Wesley O. Johnson
By Ahlberg, Nupper & Gradolph
Attorneys Feb. 18, 1958     G. G. FRATER ET AL     2,823,821
SEPARABLE PLASTIC PANEL BOX
Filed July 6, 1955     2 Sheets-Sheet 2
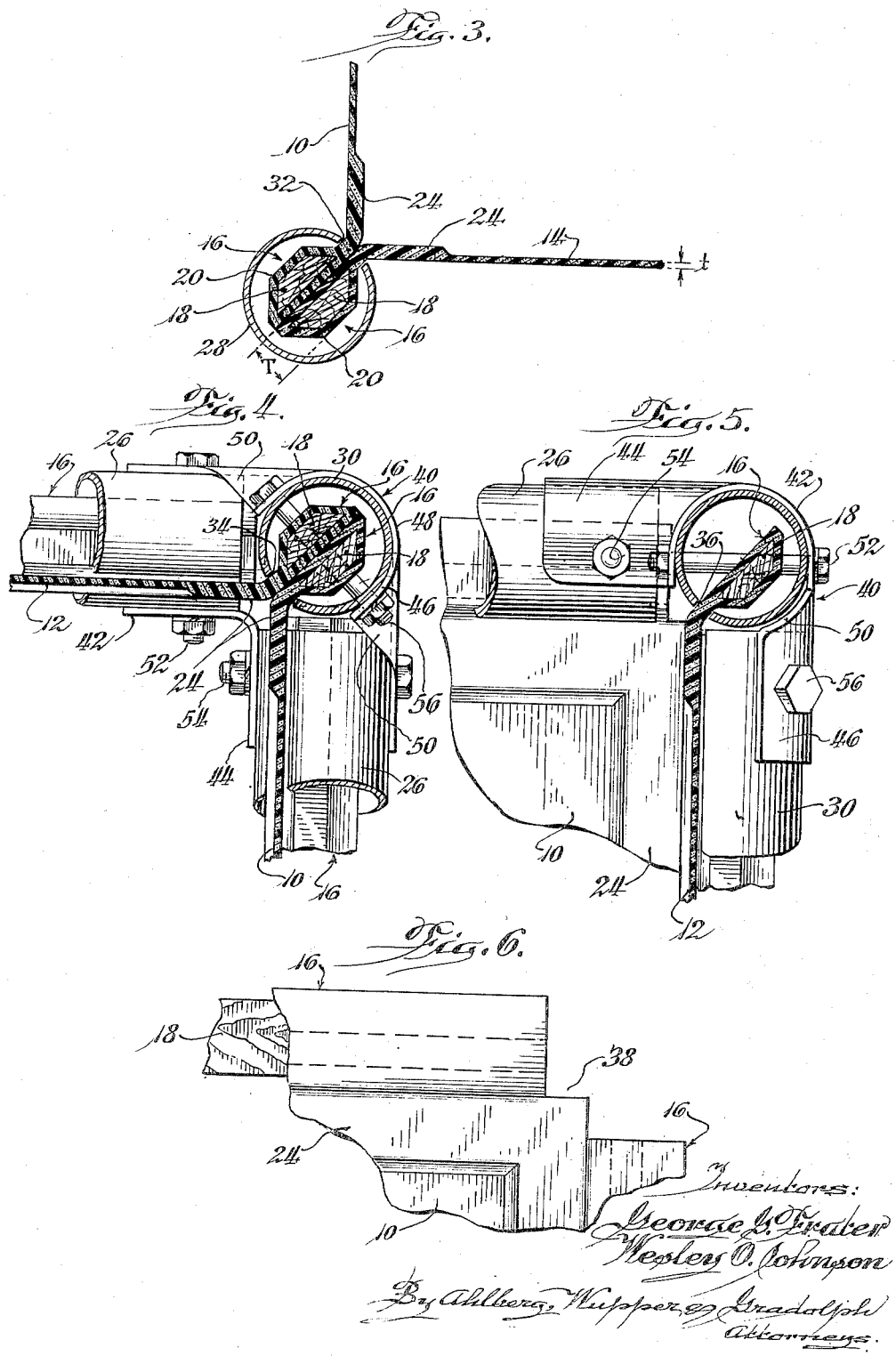

United States Patent Office 2,823,821
Patented Feb. 18, 1958

2,823,821

SEPARABLE PLASTIC PANEL BOX

George G. Frater and Wesley O. Johnson, Watertown, Wis., assignors to G. B. Lewis Company, Watertown, Wis., a corporation of Wisconsin Application July 6, 1955, Serial No. 520,173

1 Claim. (Cl. 220—4)

The present invention relates to boxes suitable for use as transportable receivers for goods in department stores, laundries, textile mills, and general industry.

One object of the invention is to provide an exceptionally sturdy box of the above character erected from plastic panels reinforced and separably connected together in an improved manner which provides for ready replacement of any number of the panels or repeated disassembly and reassembly of the box for maximum convenience in storage, transportation, and use.

Other objects and advantages will become apparent from the following description of the form of the invention illustrated in the drawings, in which:

Fig. 3 is a fragmentary sectional view on an enlarged scale taken along the line 3—3 of Fig. 1 and showing the connection between two panels along one lower edge of the box;

Fig. 4 is a fragmentary sectional view on an enlarged scale taken along the line 4—4 of Fig. 1;

Fig. 5 is a fragmentary sectional view on an enlarged scale taken along the line 5—5 of Fig. 1; and Fig. 6 is a fragmentary elevational view of a corner portion of a typical panel of the box.

Figure 1:
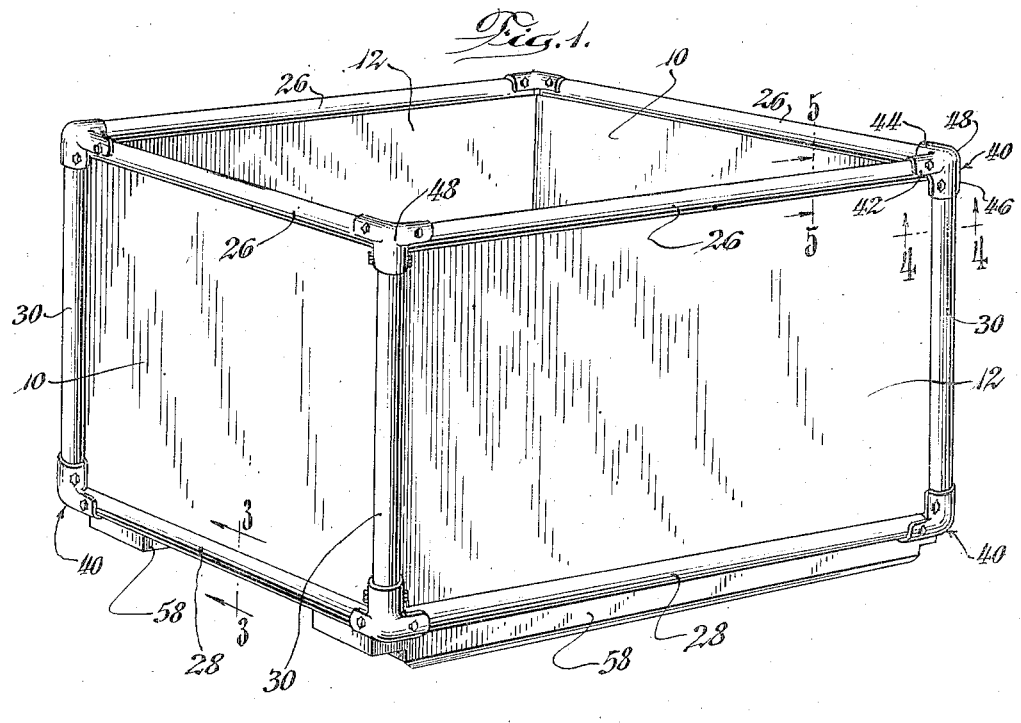
Figure 1 is a perspective view of a box incorporating the invention.
Figure 2:
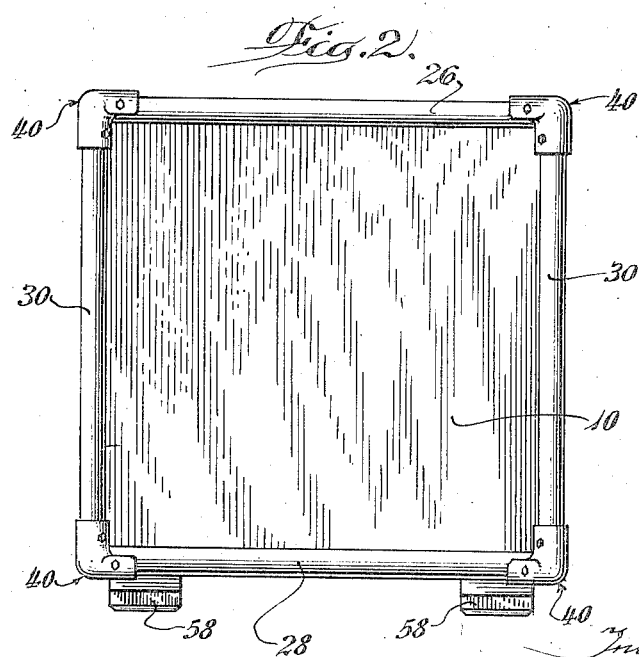
Fig. 2 is an end view of the box of Fig. 1.

Upwardly open, the rectilinear box forming the illustrated embodiment of the invention comprises two pairs of rectangular side panels 10, 12, Fig. 1, and a rectangular bottom panel 14, Fig. 3. Formed from fibrous reinforcing material, preferably woven and/or loosely felted glass fibers (sold commercially under the name "Fiberglas") imbedded in and reinforcing a plastic matrix, each of the five box panels 10, 12, and 14 is substantially flat except for the four marginal side edges of the panel, which have a special reinforced construction used in separably securing the panels together to form the box.

A cross-sectional view of the lower panel 14 at one end and of the contiguous lower edge of one side panel 10 appears in Fig. 3. As shown, the marginal edge 16 of the lower panel 14 illustrated in Fig. 3, which is typical of the four marginal edges of all five panels 10, 12, and 14, is thickened and reinforced by a wooden filler strip 18 completely encased except at its two opposite ends in a glass fiber reinforced plastic envelope 20 integral along one longitudinal edge with the adjacent main portion of the panel. As will presently appear, the filler strip 18 is only slightly shorter than the corresponding dimension of the panel in which it is embedded.

The transverse shaping of the filler strip 18 is that of an isoceles trapezoid having its longer base on the side of the strip corresponding to the side of the panel 14 facing the interior of the box. Hence the reinforcing strip 18 together with its encasing plastic envelope 20 narrows progressively in width outwardly from the side of the panel 14 facing the interior of the box.

For convenience in description the expression "marginal edge" is used specifically to denote each of the four side edges of each box panel, which is reinforced and thickened by a wooden filler strip embedded in a plastic envelope as shown for two panels 10 and 14 in Fig. 3. Similar components of the marginal edges of the several box panels are denoted by the same reference numerals, Figs. 3 to 6. It will be noted with reference to these figures, that each marginal edge 16 of the various panels 10, 12, and 14 has an effective thickness "T," as indicated in Fig. 3, which is several times the effective thickness "t" of the main portion of the panel.

To provide stronger connections between the marginal edges 16 of each box panel and the main portion of the panel, the peripheral portion 24 of the panel adjacent the marginal edges is thickened somewhat in relation to the main central portion of the panel (see Figs. 3 to 6). As shown, the thickened peripheral portion 24 of each panel merging with the marginal edges 16 has a width substantially equal to that of the marginal edges and a thickness substantially twice that of the main portion of the panel, but much less than that of the marginal edges 16.

Each marginal edge 16 of each box panel is sharply turned outwardly in relation to the interior of the box along the longitudinal juncture between the marginal edge and the adjacent peripheral portion 24 of the panel. As shown in Fig. 3, the angular displacement of each marginal panel edge 16 in relation to the main portion of the panel is such that the exterior surface of the segment of the plastic envelope 20 spanning the wider base of the filler strip 18 makes an angle of approximately 45° with the plane of the main portion of the panel.

Upon erection of the box, the four marginal edges 16 of the bottom panel 14 are contiguously engaged with the four marginal edges 16 of the respective pairs of side panels 10 and 12, as illustrated in the typical lower edge section of the box appearing in Fig. 3. Similarly, the thickened marginal edges 16 of the adjacent or intersecting side panels 10 and 12 contiguously engage each other as shown in Fig. 4.

The five box panels 10, 12 and 14 are further reinforced and separably held in assembled relation to each other upon erection of the box by twelve separate lengths of tubing individually slotted longitudinally to embrace the panel marginal edges 16 at the respective edges of the box. The four horizontal lengths of tubing used at the upper edges of the box are designated by the numerals 26; the four horizontal lengths at the respective lower edges of the box by the numerals 28; and the four vertical lengths at the vertical edges of the box, by the numerals 30.

Upon erection of the box the lower horizontal tubes 28 are moved longitudinally into embracing relation to the exteriorly protruding panel edges 16 extending along the adjacent edges of the box. As shown in the typical lower sectional edge view of Fig. 3, each tube 28 is longitudinally slotted at 32 as previously mentioned to provide clearance for the junctures between the two marginal panel edges 16 embraced by the tube and the connected panels of the box. Moved longitudinally into embracing relation to the projecting panel marginal edges 16 at the vertical edges of the box, the vertical tubes 30 are longitudinally slotted at 34, as shown in Fig. 4, to receive the junctures between the embraced marginal panel edges and the connected side panels. Each upper tube 26, longitudinally slotted at 36, Fig. 5, is moved longitudinally into embracing relation to the thickened upper marginal edge 16 of the adjacent box panel.

To facilitate longitudinal movement of the lengths of tubing 26, 28, and 30 into or out of assembled position on the marginal panel edges 16 at the respective edges of the box in the manner described, the opposite ends of each marginal panel edge 16 are terminated slightly short of the adjacent corners of the panel, thus providing corner clearance notches 38 for tubing perpendicular to the panel at each corner. The construction of one corner of the panel 10, which is typical of all five box panels, is shown in Fig. 6.

As indicated in Figs. 4 and 5, the tubular members 26, 28 and 30 are approximately equal in length to the panel marginal edges 16 embraced by the respective tubular members.

The three tubular members terminating at each corner of the box are firmly yet detachably secured together by eight corner brackets 40 at the respective corners of the box. Formed of sheet metal each bracket 40, Figs. 1, 2, 4 and 5, has three leg portions 42, 44, and 46 extending in mutually perpendicular relation to each other from a central connecting portion 48, Fig. 1, which has a rounded, partially spherical curvature. Semi-cylindrical in form, the two horizontal leg portions 42, 44 of each bracket 40 are substantially symmetrical respectively about two perpendicular vertical planes. The third or vertical leg portion 46 of the bracket, also semi-cylindrical in shape, is substantially symmetrical about a vertical plane substantially bisecting the interior angle of the two planes of symmetry of the other two leg portions. The ends of the opposite side edges of the leg portion 46 of each bracket adjacent the central connection portion 48 are reinforced by integral flanges 50 extending to the adjacent outer edges of the respective leg portions 42, 44, as shown in Figs. 4 and 5.

Upon erection of the box, three bolts 52, 54, and 56 are assembled transversely in the respective leg portions 42, 44, and 46 of each bracket 40, the bolts passing through the tubular members and the panel marginal edges embraced by the bracket leg portions. Thus bolted in place, each semicylindrical bracket leg portion (which by virtue of its shaping has inherently high bending strength) embraces the attached tubular member with a snug saddle fit. The overall result is exceptional strength and sturdiness of construction.

Well adapted for use in department stores, laundries, textile mills and general industry as a transportable receiver, the upwardly open box thus formed is reinforced on the underside by a pair of parallel skids 58 attached to the lower box panel 14 and adapted to provide support to the box as it is slid along the floor. If desired, the skids 58 may be replaced by conventional casters attached in a suitable manner to the lower box panel 14.

The reinforced box thus provided can be readily disassembled and reassembled for the greatest convenience in storage, transportation, and use. Erected in the manner described, the box is readily separable simply by detaching the corner brackets 40 and sliding the tubular lengths 26, 28 and 30 longitudinally out of embracing relation to the panel marginal edges 16. This reduces the box to its simple components from which it can be readily put together again.

In the event of damage to one of the box panels, an extremely unlikely occurrence in view of the great strength of the fiber reinforced plastic material from which the panels are formed, removal of the damaged panel and replacement with a new panel is an extremely simple procedure requiring only a partial disassembly and reassembly of the box in the manner described.

While we have shown and described a preferred embodiment of our invention, it will be apparent that numerous variations and modifications thereof may be made without departing from the underlying principles and scope of the invention. We therefore desire, by the following claims, to include all such variations and modifications by which substantially the results of our invention may be obtained through the use of substantially the same or equivalent means.

We claim:

A separable rectilinear box comprising, in combination, for rectangular side panels and one rectangular bottom panel, each panel being of plastic construction and having a generally flat form, each panel having four marginal edges each formed by a filler strip encased in plastic material integral with the panel, each filler strip having a transverse shape narrowing progressively in width away from the side of the panel marginal edge incorporating the filler strip which corresponds to the side of the attached panel facing the interior of the box, each marginal panel edge formed by a plastic encased filler strip having a thickness substantially greater than that of the adjacent portion of the attached panel, the four thickened marginal edges of the bottom panel being turned downwardly at an angle to the plane of the panel, the lower marginal edges and the vertical marginal edges of each side panel being turned outwardly in relation to the planes of the respective panels, the adjacent marginal edges of adjoining panels mating together, longitudinally slotted tubular members extending along the respective edges of the box and embracing the adjacent marginal panel edges longitudinally on opposite sides thereof substantially to the junctures of said marginal panel edges with the attached panels, corner brackets at the respective corners of the box, each corner bracket having a central connecting portion and three semicylindrical leg portions extending from the central portion in mutually perpendicular relation to each other for embracing contiguous end portions of the three tubular members terminating at the adjacent corner of the box, and an elongated connector extending through and firmly connecting each bracket leg portion to the adjacent tubular member.

References Cited in the file of this patent

UNITED STATES PATENTS

| 457,455 | Palmer | Aug. 11, 1891 |
| 2,676,729 | Neville et al. | Apr. 27, 1954 |

FOREIGN PATENTS

| 103,117 | Switzerland | Jan. 16, 1924 |
| 115,225 | Switzerland | July 1, 1926 |